Figure 1:
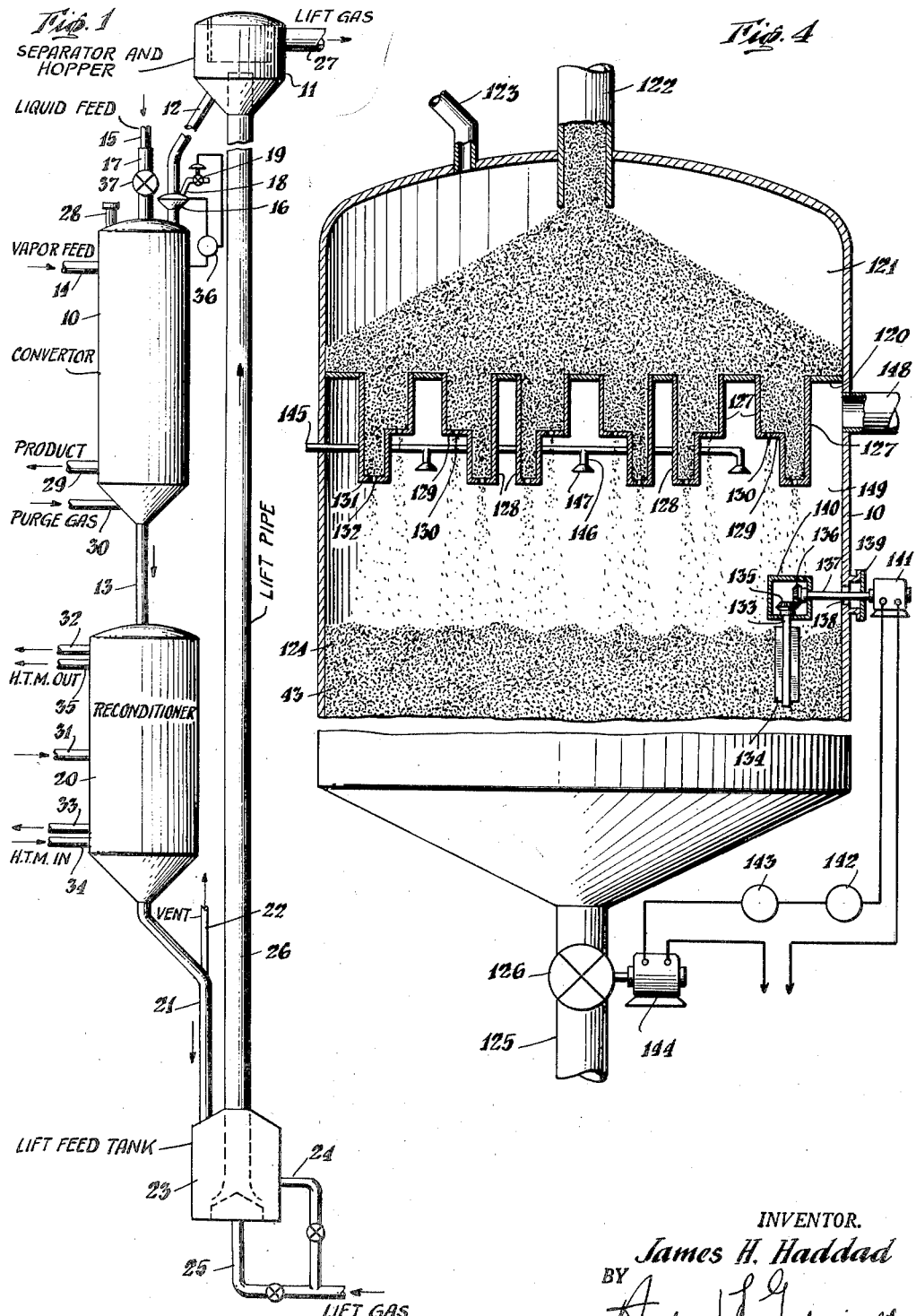

INVENTOR.
James H. Haddad
BY
AGENT

United States Patent Office 2,770,583
Patented Nov. 13, 1956

2,770,583

METHOD AND APPARATUS FOR THE CONVERSION OF LIQUID HYDROCARBONS IN THE PRESENCE OF A GRANULAR CONTACT MATERIAL

James H. Haddad, Woodbury, N. J., assignor to Socony Mobil Oil Company, Inc., a corporation of New York Application July 5, 1952, Serial No. 297,233

7 Claims. (Cl. 196—52)

This invention pertains to a method and apparatus for the conversion of high boiling liquid hydrocarbons or mixed phase hydrocarbons in the presence of a granular contact material which may or may not exhibit catalytic properties with respect to the conversion reaction. The invention is concerned particularly with an improved method and apparatus for the introduction of contact material and liquid hydrocarbon charge into the conversion zone.

Typical of processes to which this invention applies is the catalytic conversion of heated high boiling hydrocarbons wherein a granular adsorbent catalytic solid is passed cyclically through successive zones or vessels in the first of which it is contacted with high boiling liquid hydrocarbon charge to effect the conversion of said charge to lower boiling hydrocarbon products and in the second of which carbonaceous contaminants deposited on the catalyst in the conversion reaction are burned off by means of a combustion supporting gas so that the catalyst will be in a suitable condition for reuse in the conversion zone. The catalyst in this process passes through the conversion vessel and regeneration vessel as a downwardly moving, substantially compact column of granules. Other exemplary processes are the thermal visbreaking, coking or cracking of liquid or mixed-phase hydrocarbon charge by contact with heated, granular inert contact materials.

In processes wherein the contact material is catalytic in nature it may partake of the nature of natural or synthetic clays, bauxite, activated alumina or synthetic associations of silica, alumina or silica and alumina to which other substances such as certain metallic oxides may be added in small amounts for specific purposes. When the contact material is inert in character, it may partake of the form of refractory materials such as zirkite, corhart material or mullite or it may partake of the form of stones, or metallic particles or balls, or particles of coke. It is desirable to maintain the size of the contact material within the range about 3 to 100 mesh and preferably within the range about 4 to 20 mesh by Tyler Standard Screen Analysis.

In charging high boiling liquid hydrocarbons to processes of the above-mentioned types, it is important that the liquid hydrocarbons be introduced to the conversion zone in such a manner that the liquid is distributed uniformly on all or at least a major portion of the contact material supplied to the column of contact material therein. Uneven distribution of the charge on the contact material, such as is accomplished when the liquid charge is simply sprayed on the surface of the column, results in over-conversion of a portion of the charge, under-conversion of the remaining portion and uneven carbonaceous contaminant distribution on the contact material. It is also necessary that the introduction of the liquid charge be accomplished without any substantial portion of the liquid coming in contact with hot metal parts in the upper portion of the conversion chamber. This is necessary because, on contacting hot metal surfaces, the charge undergoes rapid conversion with resultant coke deposition on the metal. These coke deposits build up on the metal surfaces and break off in large pieces which pass downwardly with the contact material and plug up restricted passages in the lower section of the conversion vessel and elsewhere in the system.

One prior art method of overcoming these difficulties is to pass at least a portion of the contact material charge into the conversion chamber as a tubular shower or curtain onto the surface of the contact material column within the chamber. Liquid charge is sprayed into the shower from a point centrally within the shower and contacts the falling contact material and is sorbed thereon. The contact material with the sorbed liquid hydrocarbons on striking the surface of the column tends to distribute itself thereacross. In this system, however, some of the liquid charge, on occasions, passes through the curtain and contacts the walls therebeyond with the aforementioned undesirable effect. This is particularly true where some of the charge is atomized into a fine mist which does not tend to settle onto the column. Liquid charge directed at the lower sections of the shower is especially likely to reach these hot metal parts because the shower tends to fan out vertically and laterally at its lower end. The vertical spreading of the shower is due to the increasing velocity of the particles as they fall under the influence of the acceleration due to gravity, resulting in the lower particles pulling away from the higher. The lateral spreading is due to the difference in frictional forces on various contact material particles at the point where the shower is formed. These varying frictional forces tend to impart a slight horizontal velocity component to the particles and thereby cause them to fall in directions at small angles with the vertical. This lateral fanning out is more pronounced where the shower forming device is an inclined surface since there are not only varying frictional forces which will cause the particles to fall in differing directions but also, since the particle size of the contact material varies within a given range, different particles will assume differing trajectories as they pass from the inclined surface due to their differing weights. Thus the lateral fanning out at the lower end of the shower is more pronounced.

A major object of this invention is to provide a method and apparatus for the conversion of liquid or mixed phase hydrocarbons which overcomes the above-described difficulties.

A specific object of this invention is the provision in a continuous cyclic process for the conversion of high boiling liquid or mixed phase hydrocarbons to lower boiling products of a method and apparatus which distributes the hydrocarbon charge uniformly on the contact material supplied to a contact material column in the conversion zone without excessive accumulation of coky deposits upon metal surfaces within said zone.

These and other objects of the invention will be apparent from the following discussion of the invention.

Before proceeding with this discussion certain terms used in describing and claiming this invention will be defined. The term "gaseous" as used herein is intended to refer to a material existing in the gaseous phase under the particular conditions of temperature and pressure involved regardless of what may be the normal phase of that material under ordinary atmospheric conditions. Similarly "liquid" refers to a material in the liquid phase under the particular conditions prevailing regardless of its normal state. The term "annular" or "annular-shaped" is used herein to refer to the passage defined between two members, one being placed symmetrically within the other, having the same or different horizontal cross-sectional shapes but different horizontal cross-sectional areas regardless of whether such passage is ring-shaped or not.

Broadly the invention discloses a method and apparatus for the conversion of liquid hydrocarbons wherein a substantially compact column of granular contact material is maintained within the lower section of a confined conversion zone. A gas space is maintained above the column and contact material is continuously removed from the lower section of the column to promote downward movement of the contact material granules therethrough. Contact material is passed into the gas space and downwardly onto the surface of the column as a tubular shower or curtain. Additional contact material is passed into the gas space and downwardly onto the upper surface of the column as a second tubular shower or curtain concentrically about the first shower. Liquid charge is sprayed into the first shower from a point within the first shower and above the column so that the liquid charge becomes sorbed on the contact material in the shower. Any liquid which penetrates the first shower strikes the second shower and is carried downwardly onto the column by the contact material therein. In more preferred forms of this invention, at least a portion of the contact material in either or both of the showers is baffled at a plurality of levels to decrease the rate of acceleration of the particles therein while confining them along a narrow path of fall. This breaks the fall of the particles and promotes a uniform density of the shower along its entire length. By this means separation of the particles of the shower from each other in the lower section of the shower is minimized, and more efficient sorption of the liquid on the contact material in the showers is provided. In some cases a single curtain with the aforementioned baffling may be sufficient but generally the use of two showers is preferable. Preferably the second shower of contact material begins at a lower level in the gas space than the first shower.

Figure 2:
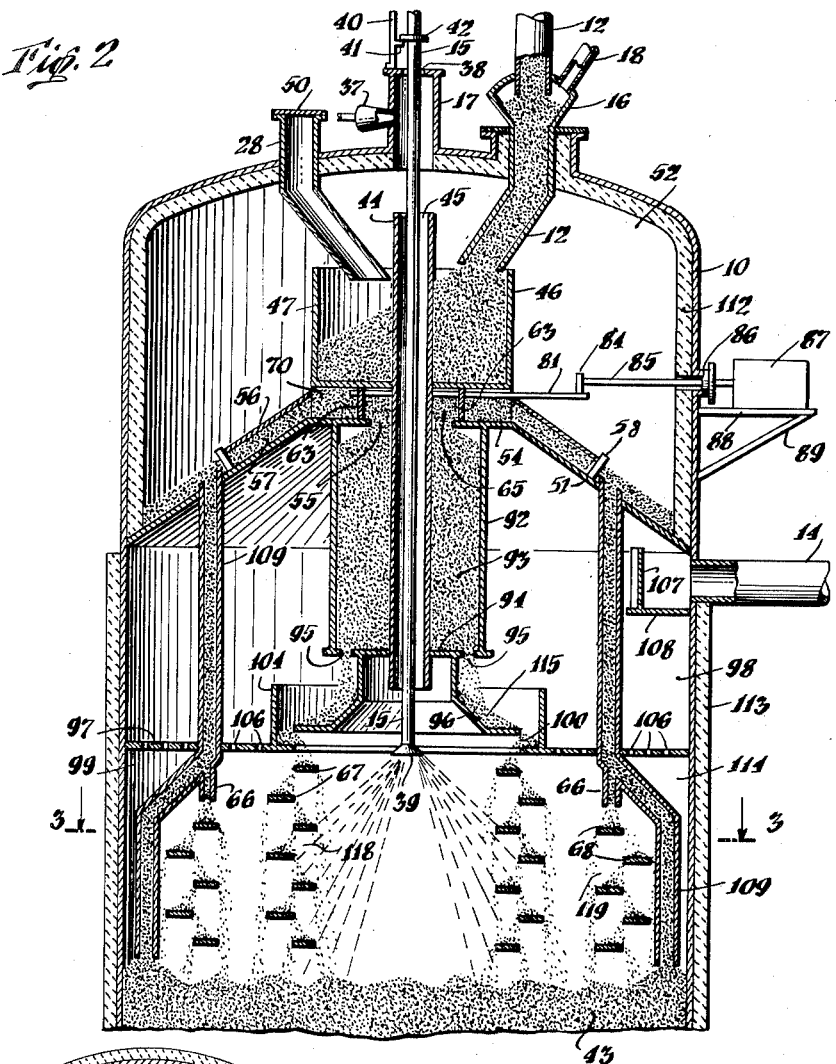
Figure 3:
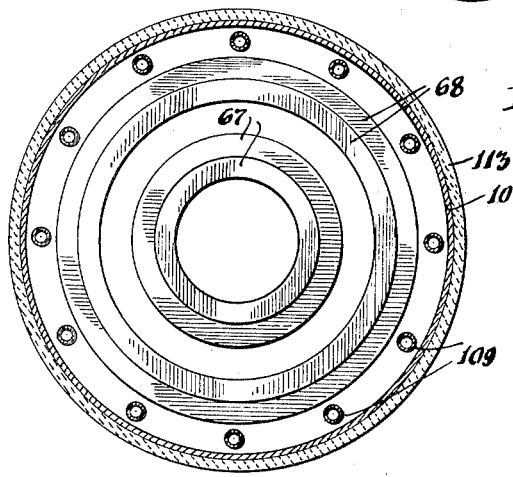

This invention is best understood by reference to the attached drawings of which, Figure 1 is an elevational view showing a typical conversion process to which this invention may be applied, Figure 2 is an elevational view, partially in section, showing the application of this invention to the upper section of a hydrocarbon conversion vessel, Figure 3 is a sectional view taken along line 3—3 of Figure 2 and, Figure 4 is an elevational view showing a modification of this invention applied to a conversion vessel.

All of these drawings are diagrammatic in form and like parts in all bear like numerals.

Turning to Figure 1, there is shown therein a conversion vessel 10 positioned vertically above a reconditioner 20, the bottom of vessel 10 being connected to the top of vessel 20 by means of a conduit 13. Gravity feed leg 21 extends from the lower end of reconditioner 20 downwardly into lift feed tank 23 therebelow and is vented by means of conduit 22. Extending upwardly from the lower section of tank 23 is lift pipe 26. Lift pipe 26 terminates within separator 11, positioned at a level above vessel 10, at a level therein intermediate the upper and lower ends of the separator. Separator 11 also acts as a storage hopper for contact material. Gravity feed leg 12 extends from the lower section of vessel 11 into the upper section of vessel 10. Seal chamber 16 is positioned on feed leg 12.

In operation contact material, at a temperature suitable for the desired conversion, flows downwardly from hopper 11 into seal chamber 16. An inert seal gas, such as steam or flue gas, may be admitted to the seal chamber through conduit 18 at a rate controlled by diaphragm valve 19 which is operated by differential pressure controller 36 to maintain a pressure within chamber 16 slightly above the pressure in vessel 10. Seal gas and contact material pass into the upper section of vessel 10.

A substantially compact column of contact material is maintained within the lower section of vessel 10 and contact material is continuously removed through passage 13 to promote downward movement of the contact material granules through the column. Contact material, admitted to the upper section of vessel 10 by means of passage 12, is contacted with a high boiling hydrocarbon charge admitted to vessel 10 through central vertical conduit 15 as described hereinbelow. A vaporized hydrocarbon charge may be admitted through passage 14. Hydrocarbon charge passes downwardly through the compact column of contact material within vessel 10 to effect the desired conversion to lower boiling gaseous hydrocarbon products which may contain high percentages of gasoline and fuel oil. Products of conversion may be withdrawn from vessel 10 through passage 29. Disengaging means for freeing the gaseous product from the contact material column should be used in conjunction with conduit 29. Any number of suitable arrangements may be used such as those shown in Simpson et al., U. S. Patent No. 2,336,041, Bergstrom, U. S. Patent No. 2,458,498 and Fahnestock, U. S. Patent No. 2,362,621. Baffles adapted to insure uniform withdrawal of contact material from vessel 10 through passage 13 may be provided in the lower section of vessel 10. Such baffles are shown in Evans et al., U. S. Patent No. 2,412,136. Used contact material is purged with a suitable inert gas, such as steam or flue gas, admitted through conduit 30 and the purged contact material is passed to the upper section of reconditioning zone 20 by passage 13. If the process is one, such as catalytic cracking, in which a substantial amount of carbonaceous contaminant is deposited on the used contact material, the reconditioner 20 will take the form of a catalyst regenerator. Air to burn off the contaminant is passed into zone 20 at an intermediate level within a compact column of used contact material therein. Flue gas is withdrawn through passages 32 and 33. In order to prevent overheating of the contact material to damaging levels, cooling tubes (not shown) may be provided within zone 20. These tubes have an inlet 34 for heat transfer medium and an outlet 35. If the process is a non-catalytic process, for example, wherein the amount of coke deposit is negligible, or if it be a process in which the amount of carbonaceous deposit is insufficient, upon combustion, to heat the contact material to the desired inlet temperature to vessel 10, the reconditioner 20 may take the form of an apparatus the principal function of which is to heat the contact material. Other regenerator constructions than that shown and described hereinabove are contemplated within the scope of this invention. Contact material passes from zone 20 through gravity feed leg 21 into gas lift feed tank 23. In this tank contact material is thoroughly mixed with suitable lift gas such as air, steam, flue gas, etc. supplied through conduit 24 and 25. The lift feed tank may be of any of the constructions well known to those skilled in the art. The lift gas transports the contact material upwardly through lift pipe 26 to separator 11 wherein the lift gas is removed through passage 27 while the contact material settles into the lower section of the separator.

Figures 2 and 3 illustrate the apparatus in the upper section of conversion vessel 10 and these two figures will be considered together. Conduit 17 extends upwardly from the center of cylindrical vessel 10 and has gate valve 37 positioned thereon intermediate its upper and lower ends. A stuffing box 38 is provided at the upper end of conduit 17 through which liquid feed pipe 15 may pass into the upper section of vessel 10. Spray nozzle 39 is attached to the lower end of pipe 15. Conduit 17 should be sufficient in internal horizontal cross-sectional area to permit free passage of spray device 39 and pipe 15 therethrough. A suitable support member 40 with vertically adjustable angle piece 41 extends upwardly from the upper end of conduit 17 while pipe 15 has a stop, protuberance or flange 42 fixed thereon at an appropriate position so that the lower end of said pipe may be adjusted to any one of a number of different positions above contact material column 43 within vessel 10. A sleeve 44 fits loosely about conduit 15 and extends from a point just below the upper end of vessel 10 to a point shortly above nozzle 39. Sleeve 44 is of such horizontal cross-sectional area that spray nozzle 39 will pass freely therethrough thereby providing an annular space 45 between pipe 15 and the inner wall of 44. By this arrangement liquid feed pipe 15 and nozzle 39 may be withdrawn at any time without completely shutting down operations within vessel 10. Pipe 15 is simply moved upwardly until nozzle 39 is in the upper section of conduit 17 above valve 37. Valve 37 is then closed and stuffing box 38, pipe 15 and nozzle 39 removed from conduit 17. A receptacle 46 is fitted about the upper section of sleeve 44 with open end below the upper end of the sleeve so as to define a space 47 for contact material accumulation. The bottom of receptacle 46 is fastened tightly to the outside of sleeve 44. Feed leg 12 passes into the upper section of vessel 10 and terminates at a point such that contact material from 12 will be discharged into space 47 within receptacle 46. Conduit 28 extends into the upper end of vessel 10 and terminates within receptacle 46 so that the vessel may be refilled with contact material if the system is empty. In normal operation this conduit is closed off by blind flange 50 or by means of a valve or seal and feeding device. An upright frusto-conical partition 51 of the same upper diameter as receptacle 46 extends across the upper section of vessel 10 with upper end at a level below receptacle 46 so as to define a seal chamber 52 above partition 51 in the upper end of vessel 10. A horizontal partition 54 extends across the upper end of partition 51 and has an opening 55 at its center of substantially larger cross-sectional area than sleeve 44 through which the sleeve passes. A second frusto-conical partition 56 is fixed a spaced distance above the first-named frusto-conical partition and extending downwardly to a point adjacent to but not in contact with the inner periphery of vessel 10 so as to define a frusto-conical passageway 57 for contact material flow. Supports 58 are provided at the lower end of partition 56. Partitions 63 extend upwardly from partition 54 and attach to the bottom of receptacle 46 around opening 55 so as to define a central passageway 65 in communication with opening 55. Passageways 70 are provided on the outside of partitions 63 in communication with passageway 57. Openings (not shown) are provided in the bottom of receptacle 46 in communication with passageway 65 and further openings (not shown) therein in communication with passageways 70. Horizontally spaced apart slide valve plates 81 are provided to open and close communication between receptacle 46 and passageway 65. Plates 81 are joined at their outer ends by a solid bar 84 to which is attached a shaft 85. Shaft 85 extends through the wall of vessel 10 by means of stuffing box 86 and has attached to its outer end an operating mechanism 87 which may be any suitable mechanism to move plates 81 inwardly and outwardly. Operating mechanism 87 is supported on a platform 88 by a brace 89. Extending downwardly centrally from partition 54 beneath opening 55 is cylinder 92 which is of greater cross-sectional area than opening 55 and fitted about sleeve 44 so as to form an annular chamber or passageway 93. The lower end of 93 is closed off by flange or plate 94 which fits tightly about sleeve 44 passing therethrough. A plurality of orifices 95 penetrate flange 94 in a circular pattern at spaced-apart points near the outer periphery of chamber 93. A partition, consisting of two sections 96 and 97 extends transversely across vessel 10 so as to define a plenum chamber 98 above the partition and a conversion chamber 99 therebelow. The central portion of 96 extends downwardly from flange 94 as an upright cylinder of greater diameter than sleeve 44 but of less diameter than the circular pattern of orifices 95. Partition section 96 flares outwardly until it becomes substantially horizontal on its outer end. Partition section 97 is in the form of an annular plate with inside diameter, preferably but not necessarily, greater than the diameter of section 96 at its lower end so that an annular-shaped passageway 100 is formed between sections 96 and 97. Section 97 lies in a horizontal plane a spaced distance below the lower end of section 96 and is attached on its outer end to the walls of vessel 10. An upright cylindrical member 104 of diameter greater than the inside diameter of section 97 is fixed centrally on section 97 to prevent contact material from passing to the outer portion of partition 97. A plurality of spaced-apart orifices 106 pass through 97 in the region between cylinder 104 and the wall of vessel 10. A vaporized hydrocarbon charge port 14 extends into plenum chamber 98. A baffle 107 for the dispersal of vaporized charge is fixed in front of 14 and supported by platform 108. A plurality of substantially vertical contact material passageways or conduits 109 extend downwardly from a level just above partition 51 to a level a susbtantial distance below partition section 97 within conversion chamber 99. Conduits 109 terminate at a plurality of points on a common level adjacent the walls of vessel 10. Conduits 66 extend downwardly from each of conduits 109 and terminate within chamber 99 at a level below partition section 97 but above the lower ends of passageways 109 and at points in a circular pattern horizontally between passageways 109 and annular passageway 100. A plurality of vertically spaced-part annular shaped baffles 67 are spaced in staggered relationship with each other beneath passageway 100. These baffles are adapted to receive contact material flowing from passageway 100. A second plurality of vertically spaced apart annular-shaped baffles 68 are fixed concentrically about baffles 67 beneath conduits 66 so as to receive contact material therefrom. Baffles 68 are in staggered relationship to each other. Concrete lining 112 is provided on the inner wall of chamber 52 to prevent excessive heat losses from the chamber. For the same reason exterior insulation 113 is provided over the remainder of the vessel length.

In operation, contact material enters vessel 10 together with seal gas from seal chamber 16 through passage 12 and discharges into an accumulation of contact material within receptacle 46. The seal gas distributes itself throughout chamber 52 within the upper end of vessel 10. Compact streams of contact material pass from the lower end of this accumulation through passages 70 from which it is transferred into the upper end of passage 57. Contact material gravitates from the lower end of 57 as a plurality of compact streams through passages 109 onto the surface of contact material column 43 in the lower section of conversion zone 99. The flow of the contact material streams in conduits 109 acts to maintain the upper surface of column 43 at about a constant level beneath the upper end of zone 99 since the level of 43 serves to throttle the flow in passages 109. Thus a gas space 114 is defined in the upper end of zone 99 above column 43. Contact material also gravitates from receptacle 46 through passages 65 and opening 55 into passage 93. Contact material flows through passage 93 as a substantially compact stream. Contact material is discharged from 93 through orifices 95 and drops as a plurality of streams onto a stagnant layer of contact material 115 which is maintained on the surface of partition section 96 due to the configuration of section 96. The contact material flows over layer 115 and is discharged as a central annular-shaped stream through passageway into the upper section of gas space 114. Contact material discharged from passageway 100 passes downwardly onto the surface of column 43 as a central tubular shower 118. The flow of contact material in shower 118 is baffled by baffles 67 so that at least a portion of the shower passes downwardly as a cascade over baffles 67. The remainder drops freely down from the outside edges of baffles 67. This baffling acts to decrease the downward velocity of the particles thereby decreasing the vertical separation of the particles and the tendency for the particles to pull away from each other in the lower section of the shower as they do when the shower is freely falling. In addition the baffling tends to direct a major portion of the particles along a single downward path and thereby reduce the lateral fanning out of the shower. Contact material passes from passages 109 as a plurality of streams through passages 66 and is discharged therefrom as a plurality of showers. These showers act together to form a second tubular shower 119 concentrically about first shower 118. This second shower 119 is desirable because while baffles 67 materially reduce the separation of the particles in shower 118 some separation of the particles still occurs at the lower end of 118. Shower 119 originates at a lower level than shower 118 so there will be less tendency for the particles therein to separate than the particles in 118. In addition shower 119 is baffled at successively lower levels in the same manner as shower 118 so that at least a part of the contact material therein passes downwardly as a cascade to the upper surface of column 43. The baffling breaks the fall of the particles at a plurality of levels while restricting them laterally to a narrow path so that a more uniform shower density is promoted along the entire length of the shower. Liquid charge is supplied to spray device 39 by conduit 15 and sprayed therefrom as a uniform conical-shaped shower downwardly and outwardly into shower 118 wherein a major portion of the liquid charge is sorbed on the contact material and is distributed over the surface of column 43 with the contact material from the shower 118. Any liquid charge which passes through the lower portion of shower 118 contacts shower 119 and becomes sorbed on the contact material therein. If desired, vaporized hydrocarbon charge may be admitted through conduit 14 to plenum space 98 and supplied to conversion zone 99 through orifices 106 as a plurality of vapor streams. These vapor streams have the tendency to force any liquid charge beneath them into column 43. Hydrocarbon charge then passes through column 43 to effect the desired conversion.

Figure 4 illustrates an alternative system for effecting the process of this invention. It also illustrates the use of a plurality of points of liquid introduction to the conversion chamber. Referring to Figure 4, there is shown therein conversion vessel 10 having a transverse partition 120 across its upper section so as to divide the vessel into a seal chamber 121 thereabove and a conversion chamber 124 therebelow. A contact material supply conduit 122 extends into the upper section of chamber 121 and seal gas conduit 123 discharges into chamber 121. Conduit 125 for the removal of contact material extends from the bottom of vessel 10 and is equipped with flow control valve 126. A plurality of substantially vertical, annular-shaped passageways 127 depend downwardly at spaced-apart locations from partition 120 and terminate within the upper section of chamber 124. Extending from the outer section of the bottom of each of passageways 127 is a second annular passageway 128 which extends downwardly to a level substantially below the bottom of 127. A flow restriction plate 129 with an annular opening or passageway 130 extends across the inner section of each of passageways 127 while a second flow restriction plate 131 with annular opening or passageway 132 therethrough extends across the bottom of each of passageways 128. Thus, a plurality of pairs of annular passageways for contact material flow are provided, each pair consisting of an inner passageway formed by the inner section of 127 and opening 130 and an outer passageway formed by the outer section of 127, passageway 128 and orifice 129 concentrically about the inner passageway. Means for the control of the surface level of a conduit column of contact material at a level substantially below the lower ends of passageways 128 are provided within conversion chamber 124 so as to provide a gas space 149 above column 43. The means shown in Figure 4 consist of a vertical rod 133 bearing vanes 134 supported within chamber 124 and extending through a short vertical section thereof at a level below the lower end of passageways 128. A bevel gear 135 is provided at the upper end of rod 133 and this gear meshes with a second bevel gear 136 provided on the end of a horizontal drive shaft 137. Shaft 137 is supported by bearings 138 and a stuffing box 139 is provided to prevent escape of gases from chamber 124. A shield 140 is provided to protect gears 135 and 136 from contact material particles. The mechanism is driven by motor 141 connected to shaft 137 and the arrangement is such that rod 133 bearing vanes 134 is continuously rotated within contact material column 43. The higher the surface level of column 43 between the upper and lower ends of vanes 134 the greater is the power requirement to drive rod 133. A watt meter 142 specially calibrated to indicate the level of the contact material column is connected in the power line to motor 141. Also connected into the circuit is a suitable electrical mechanism 143 activated by the fluctuations of power requirements for motor 141 to control the operation of a second motor 144 connected to flow control valve 126 so as to automatically adjust valve 126 to maintain a substantially constant column level within chamber 124 along the length of vanes 134. Other mechanisms than that described above may be used to control the surface level of column 43.

Liquid feed conduit 145 extends laterally into conversion chamber 124 and has pipes 146 with spray nozzles 147 attached thereto depending downwardly therefrom. One of nozzles 147 is fixed along the center line of each of passages 127 and 128 within the space enclosed by 128 or its projection above column 43. A vapor feed conduit 148 is also provided.

In operation, contact material is supplied to an accumulation thereof in seal zone 121 through passage 122. Contact material gravitates from this accumulation as a plurality of substantially compact streams into gas space 149 in conversion zone 124 through the inner sections of passages 127. Contact material is discharged from these streams through openings 130 and passes downwardly onto the upper surface of contact material column 43 as a tubular shower of contact material. Contact material also gravitates from zone 121 as a second plurality of substantially compact annular streams through the outer section of 127 and passageway 128 and is discharged therefrom through openings 132 into gas space 149 at a level below the upper ends of streams from passages 130. Contact material from this second plurality of streams then passes onto the upper surface of column 43 as a plurality of tubular showers concentrically about the tubular showers from opening 130. Liquid charge is introduced through pipe 145 and is sprayed into the tubular showers emanating from passages 130 from a point within each shower and above the upper surface of column 43 by means of spray devices 147. The liquid charge is sorbed on the falling contact material and the process proceeds as described in connection with Figure 2. It will be noted that in the modification of Figure 4, the contact material forming the various tubular showers does not roll off of an inclined surface but is delivered substantially vertically downwardly through openings 130 and 132. Thus the tendency for the shower to fan out laterally because of the variation in particle size of the contact material is eliminated. This vertical delivery of the particles also minimizes the lateral separation of the particles caused by the frictional forces between the particles. Of course, the separation of the particles vertically in the lower section of the shower due to the influence of gravity still occurs. For this reason, the separation of the particles in the showers of the apparatus of Figure 4 will be greater than that of the apparatus of Figure 2 where the showers are baffled and it is, therefore, important that two showers be used. It is also important that the outer shower originate at a lower level than the inner, since, because of the shorter distance of fall for the outer shower, it will not have thinned out to the extent of the inner curtain near the bed surface and will stop any liquid passing through the thinned out lower portion of the inner curtain.

The dimensions of the various elements making up the improved method and apparatus of this invention will, of course, depend to a large extent upon the particular operation and operating conditions involved. While the conversion vessel and various tubular showers and passages forming said showers have been illustrated above as being circular in horizontal cross-sectional shape they may assume any other desired shape such as rectangular, hexagonal, etc. Generally the inner tubular shower such as 118 of Figure 2, should enclose a minor fraction of the gas space above column 43, usually only about 2 percent to 50 percent of the horizontal cross-section of the gas space and preferably 5 percent to 20 percent of that area. While the inner shower 118 is shown at the center of the conversion chamber this is not necessary within the broader scope of the invention. It is desirable, however, that that shower 118 with the liquid charge spray means therein be removed a reasonable distance from the walls of the conversion chamber. It is desirable that the outer tubular shower, such as 119, originate at a level beneath the level at which the inner shower 118 originates. However, within the broader scope of the invention the two showers may originate at the same level or the outer shower may even originate at a higher level than the inner. Also, both showers should have a vertical height within the range 1 foot to 10 feet and preferably 1 foot to 5 feet. The vertical height of column 43 may vary from about 3 to 40 feet depending on the process. Where conduits 109 are used to control the surface level of column 43, the conduits may discharge onto the surface of column 43 from 10 to 50 percent of the total contact material circulated. The remainder of the contact material would then be divided between the two curtains, preferably but not necessarily equally. In a preferred application conduits 109 could discharge approximately 20 percent of the total flow while the remaining 80 percent was divided equally between curtains 118 and 119. Baffles 67 and 68 may take other forms than that shown. For example, they may consist of upwardly-pointing annular-shaped angle pieces.

Operating conditions will also vary widely according to the particular application. In some conversion reactions it may be desirable to introduce the liquid charge to the conversion zone cold, but it is generally preferable to heat the liquid charge to a temperature of the order of 600° F. to 850° F. before spraying it into the conversion zone. Contact material should be introduced into the conversion zone at a temperature suitable to support the desired conversion. This temperature may vary from 700° F. to 1700° F. depending on the operation. Contact material should generally be supplied to the conversion zone at a temperature within the range about 850° F. to 1150° F. but in some conversions the contact material may be supplied at temperatures as high as 1700° F. The ratio of contact material to total hydrocarbon charge may be within the range about 2.0 to 20 parts of contact material charged per part of hydrocarbon charged by weight. The total hydrocarbon space velocity may be within the range 0 to 10 volumes of oil per volume of contact material bed per hour.

This invention should be understood to cover all changes and modifications of the examples of the invention herein chosen for purposes of disclosure which do not constitute departures from the spirit and scope of the invention.

I claim:

1. A process for the conversion of high boiling liquid hydrocarbons to lower boiling gaseous products in the presence of a granular contact material, which comprises: maintaining a substantially compact column of granular contact material throughout the lower section of a confined conversion zone, maintaining a gas space above said column in the upper section of said conversion zone, removing contact material from the lower section of said column so as to promote the downward movement of contact material granules in said column, passing contact material into the upper section of said gas space and downwardly through said gas space and onto the upper surface of said column as a tubular shower, passing additional contact material into said gas space and downwardly through said gas space and onto the upper surface of said column as a second tubular shower positioned concentrically about said first-named tubular shower, baffling the flow of contact material in said second shower so as to reduce the rate of acceleration of the particles in said second shower while confining the particles laterally so that a major portion of the contact material in said shower passes downwardly in a single downward path, spraying high boiling liquid hydrocarbon charge into said first-named shower from a point within said shower and above said column whereby the liquid charge will be sorbed on showering contact material granules, passing the liquid charge downwardly through said column to effect the desired conversion to lower boiling gaseous products, and removing gaseous products from the conversion zone separately of the contact material.

2. A process for the conversion of high boiling liquid hydrocarbon charge to lower boiling gaseous products in the presence of a granular contact material which comprises: maintaining a substantially compact column of granular contact material at a temperature suitable for the desired conversion throughout the lower section of a confined conversion zone, maintaining a gas space above said column in the upper section of said conversion zone, removing contact material from the lower section of said column to promote the downward movement of contact material granules through said column, passing a first annular-shaped stream of contact material into the upper section of said gas space, discharging contact material from said first stream at a level substantially above said column downwardly as a first tubular shower onto the upper surface of said column, baffling the flow of contact material in said first shower at a plurality of vertical levels so that at least a portion of said contact material in said shower passes downwardly as a cascade, passing a second tubular shower of contact material concentrically about said first shower downwardly through said gas space from a level below the upper end of said first shower onto the upper surface of said column, baffling the flow of contact material in said second shower at a plurality of vertical levels so that at least a portion of said shower passes downwardly as a cascade, spraying a high boiling liquid hydrocarbon charge into said first shower from a point within said first shower and above said column, whereby the liquid charge will be sorbed on descending contact material, passing the liquid charge downwardly through said column to effect the desired conversion to lower boiling gaseous products, and removing the gaseous products from the lower section of the conversion zone.

3. A process for the conversion of high boiling liquid hydrocarbon charge to lower boiling gaseous products in the presence of a granular contact material, which comprises: maintaining a substantially compact column of granular contact material throughout the lower section of a confined conversion zone, maintaining a gas space above said column within the upper section of said conversion zone, maintaining an accumulation of contact material above said conversion zone, passing a stream of contact material downwardly from said accumulation and discharging the contact material from said stream as an annular-shaped stream centrally into the upper section of said gas space, passing contact material discharged from said annular-shaped stream downwardly through said gas space and onto the upper surface of said column as a central tubular shower of contact material, baffling the flow of contact material in said shower at a plurality of vertically spaced-apart levels so that at least a portion of said shower is confined laterally to a narrow path and passes downwardly as a cascade, and the downward rate of acceleration of the particles is decreased whereby uniform shower density along the entire length of the shower is promoted, passing a plurality of substantially compact streams of contact material from said accumulation downwardly onto the upper surface of said column at horizontally spaced-apart points adjacent to the outer edge of said column, passing a stream of contact material from each of said plurality of streams at a level above the upper surface of said column, discharging said last-named streams within said gas space at a level above the upper surface of said column but below the discharge level of said annular-shaped stream and at points horizontally between said first-named plurality of conduits and said central tubular shower, showering contact material from each of said last-named conduits downwardly onto the upper surface of said column, baffling the flow of contact material in each of said last-named showers at a plurality of vertically spaced-apart levels so that at least a portion of the contact material in each of said last-named showers is confined laterally to a narrow path and passes downwardly as a cascade and the downward rate of acceleration of the particles is decreased whereby uniform shower density along the entire length of the shower is promoted, spraying high boiling liquid hydrocarbon charge from a point centrally within said first-named tubular shower and above said column into said first-named tubular shower whereby a major portion of the liquid charge will be sorbed on the contact material in said shower, passing the liquid charge downwardly through said column to effect the desired conversion to lower boiling gaseous products, removing the gaseous products from the lower section of said conversion zone separately of the contact material, and removing contact material from the lower section of said column.

4. An apparatus for the conversion of high boiling liquid hydrocarbons to lower boiling products in the presence of a granular contact material which comprises in combination: an enclosed conversion chamber adapted to confine a substantially compact column of granular contact material, members defining a central annular-shaped passageway for contact material flow into the upper section of said chamber, members defining a second annular-shaped passageway for contact material flow extending into said chamber concentrically about said first annular passageway and terminating at a level below said first passageway, means for supplying contact material to both of said annular-shaped passageways, a plurality of vertically spaced-apart annular-shaped baffles below said first passageway adapted to receive contact material from said passageway, said baffles being in a staggered relationship one with the other, means for controlling the surface level of a substantially compact column of contact material within said chamber at a level below the lowermost of said baffles, a liquid spray device positioned centrally within the upper section of said chamber at a level above the lowermost of said baffles, means for supplying high boiling liquid hydrocarbon charge to spray device, means for removing products of the conversion from the lower section of said chamber separately of the contact material and means for removing contact material from the lower section of said chamber.

5. An apparatus for the conversion of high boiling liquid hydrocarbons to lower boiling gaseous hydrocarbons in the presence of a substantially compact moving column of granular contact material which comprises in combination: an enclosed conversion vessel, a receptacle adapted to contain an accumulation of granular contact material positioned within the upper section of said vessel, a transverse partition extending across the upper section of said vessel below said receptacle and having a centrally disposed annular-shaped passageway therethrough so as to define a conversion chamber below said partition, members defining a passageway for contact material from said receptacle to said annular-shaped passageway, a plurality of vertically spaced-apart annular-shaped baffles beneath said annular passageway extending downwardly to an intermediate level in the upper section of said conversion chamber and adapted to receive contact material from said annular passageway, said baffles being in a staggered relationship with each other, members defining a plurality of passageways for contact material flow extending downwardly from said receptacle through said partition and into said conversion chamber adjacent the walls of said conversion chamber to a level substantially below said partition, a conduit for contact material extending from each of said last-named passageways and terminating in said conversion chamber at a level below said partition and above the lower ends of said last-named passageways and at a point horizontally between said last-named passageways and said annular passageway, a plurality of annular-shaped baffles concentrically about said first-named plurality of baffles and at vertically spaced-apart levels beneath said last-named conduits in staggered relationship with each other and adapted to receive contact material from said last-named conduits, a liquid spray device positioned centrally within said conversion chamber at a level below said partition but above the lower ends of said first-named plurality of passageways, a conduit for the supply of high boiling liquid hydrocarbon charge extending into said vessel and connecting into said spray device, a conduit for the removal of contact material from the lower section of said vessel and means for removing products of conversion from the lower section of said conversion chamber.

6. An apparatus for the conversion of high boiling liquid hydrocarbons to lower boiling gaseous products in the presence of a downwardly gravitating, substantially compact column of granular contact material which comprises in combination: an enclosed conversion chamber adapted to confine said column of contact material in its lower section, members defining at least one annular-shaped passageway for contact material flow into the upper section of said chamber, a plurality of vertically spaced apart annular-shaped baffles arranged in staggered relationship one with the other below said passageway and adapted to receive contact material therefrom, means for controlling the surface level of said column of contact material below the lowermost of said baffles, a liquid spray device positioned centrally within the area enclosed by the projection of said annular passageway at a level above the lowermost of said baffles, means for supplying a liquid hydrocarbon charge to said spray device, means for removing products of conversion from the lower section of said chamber separately of the contact material and means for removing contact material from the lower section of said chamber.

7. In a continuous process for the conversion of fluid hydrocarbons, at least partially in the liquid phase, by passing the liquid hydrocarbons downwardly through a downwardly moving, substantially compact column of granular contact material within a confined conversion zone, the improved method of supplying the granular solids and hydrocarbon charge to the column, which comprises: passing fresh granular contact material into the upper section of the conversion zone and showering the contact material downwardly onto the upper surface of the contact material column maintained below the upper end of the conversion zone, baffling the showering contact material at a plurality of levels to decrease acceleration of the contact material particles while confining the major portion of the particles laterally along a narrow path of fall, and spraying hydrocarbon charge, at least partially in the liquid phase, onto the falling contact material at a level above the upper end of said column, whereby the hydrocarbon charge and contact material will become mixed as they pass downwardly onto the upper end of said column.

References Cited in the file of this patent

UNITED STATES PATENTS

| | | |
|---|---|---|
| 2,458,162 | Hagerbaumer | Jan. 4, 1949 |
| 2,490,336 | Crowley | Dec. 6, 1949 |
| 2,492,998 | Lassiat | Jan. 3, 1950 |
| 2,493,219 | Bergstrom | Jan. 3, 1950 |
| 2,561,420 | Schutte | July 24, 1951 |
| 2,574,850 | Utterback et al. | Nov. 13, 1951 |
| 2,689,211 | Findlay | Sept. 14, 1954 |